July 18, 1939.                B. KAHN                  2,166,909
MASTERLESS CONNECTING ROD MECHANISM FOR RADIAL ENGINES OR PUMPS
                Filed March 2, 1936        4 Sheets-Sheet 4

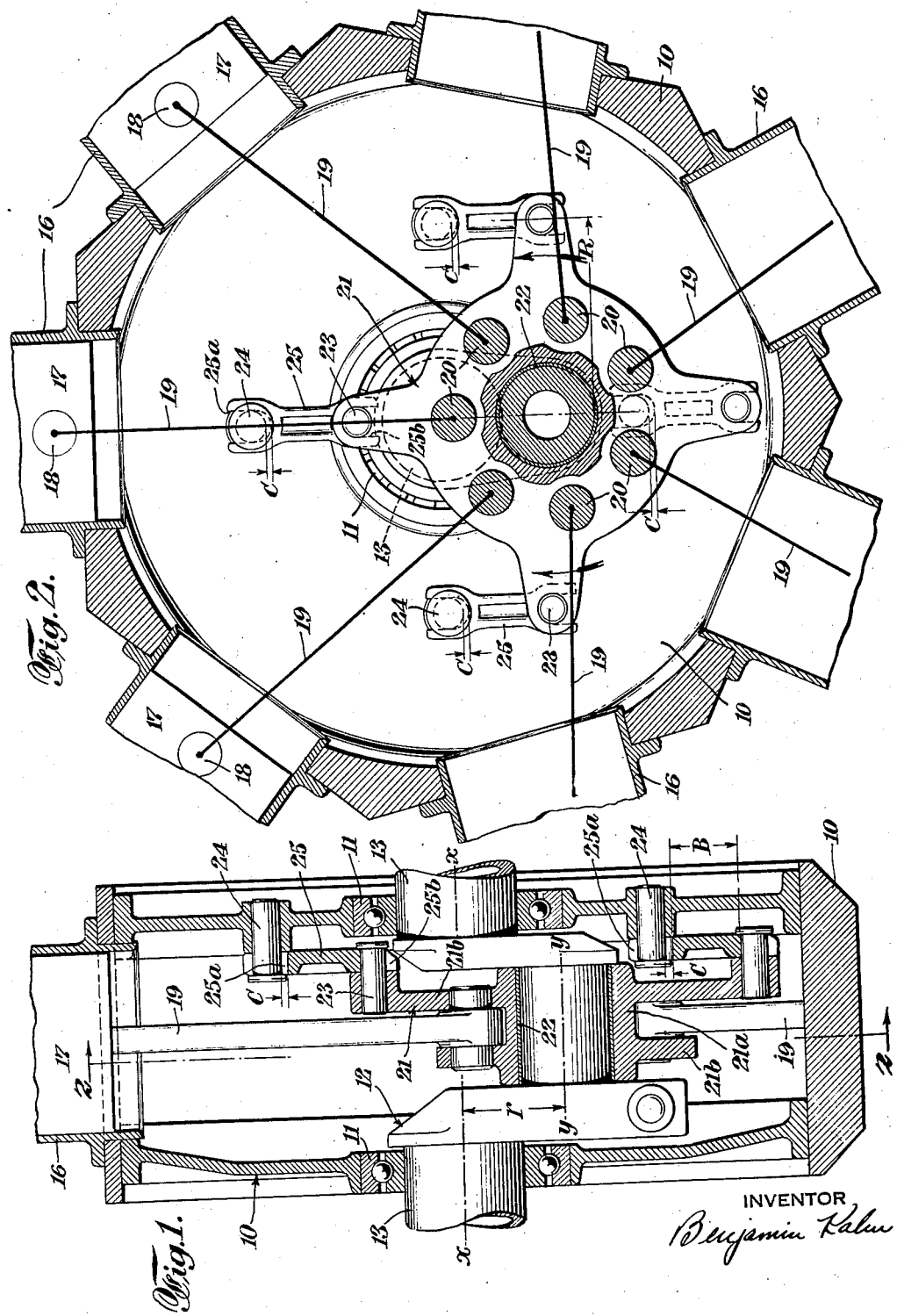
July 18, 1939. B. KAHN 2,166,909
MASTERLESS CONNECTING ROD MECHANISM FOR RADIAL ENGINES OR PUMPS
Filed March 2, 1936 — 4 Sheets-Sheet 1
INVENTOR
Benjamin Kahn July 18, 1939.  B. KAHN  2,166,909
MASTERLESS CONNECTING ROD MECHANISM FOR RADIAL ENGINES OR PUMPS
Filed March 2, 1936  4 Sheets-Sheet 2
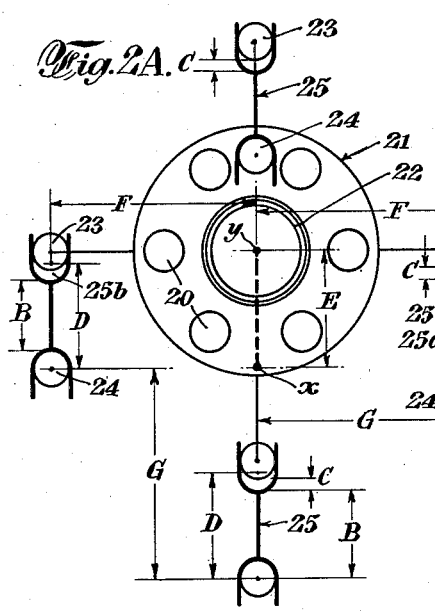
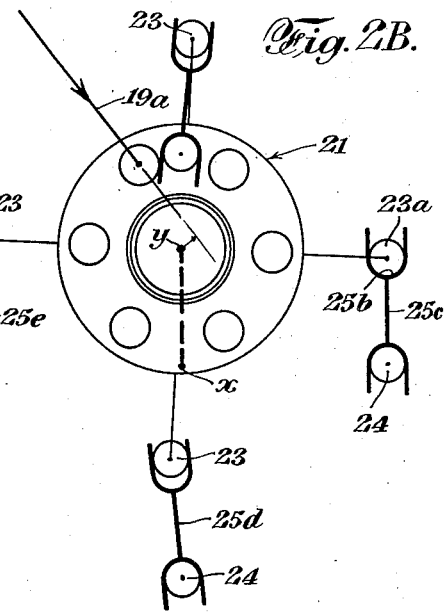
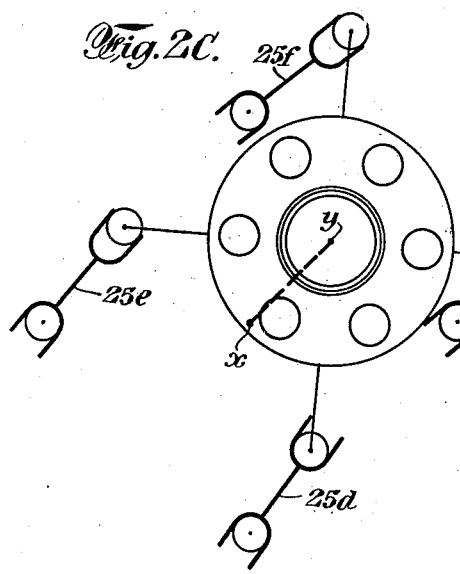
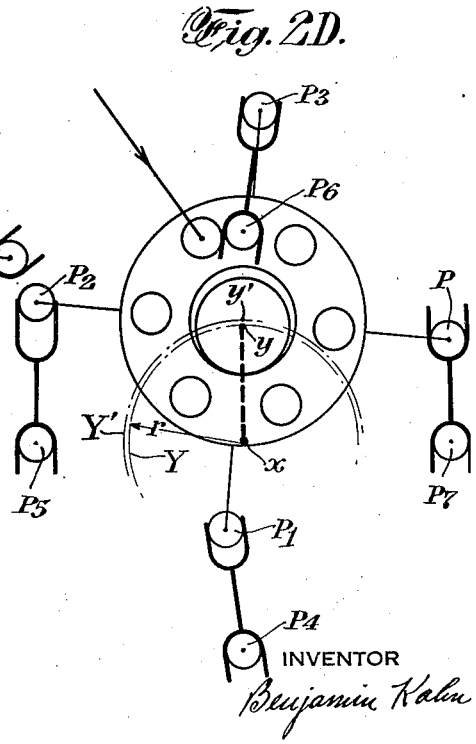
INVENTOR
Benjamin Kahn

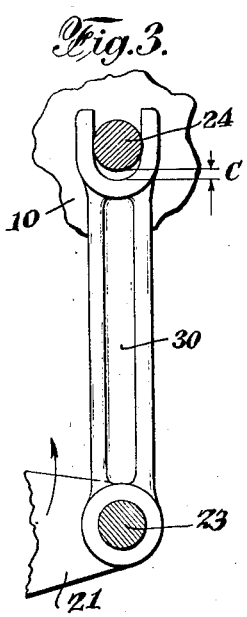
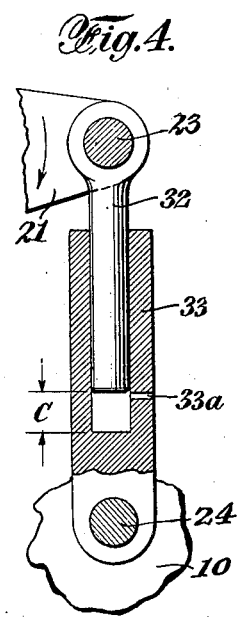
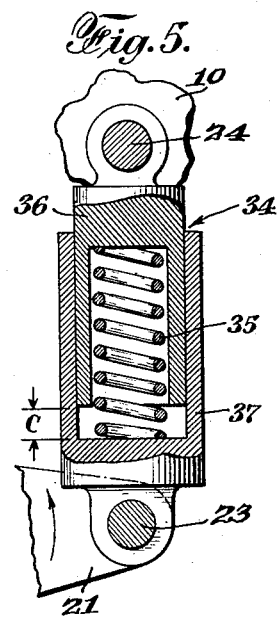
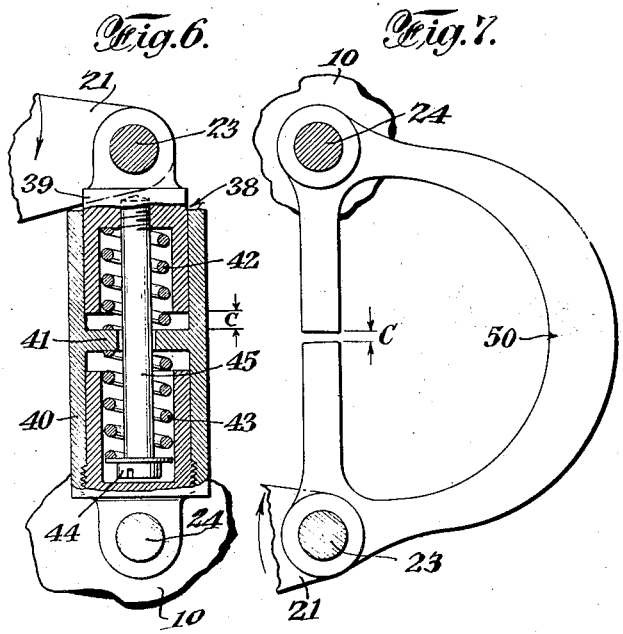
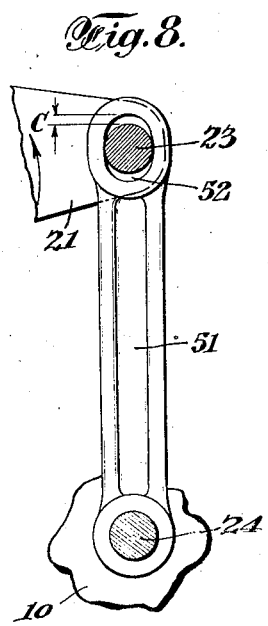

INVENTOR
Benjamin Kahn

UNITED STATES PATENT OFFICE 2,166,909

MASTERLESS CONNECTING ROD MECHANISM FOR RADIAL ENGINES OR PUMPS

Benjamin Kahn, New York, N. Y., assignor to Kinetic Cycle Research Corporation, New York, N. Y., a corporation of New York Application March 2, 1936, Serial No. 66,558
In Canada March 2, 1935

26 Claims. (Cl. 121—120)

This invention relates to improvements in mechanism for converting reciprocating motion into rotary motion or vice versa as of the type employed in "masterless" connecting-rod mechanism for radial engines or pumps. This invention also relates to the same subject matter as my co-filed application, Serial Number 66,559.

More particularly the invention is concerned with, and is an improvement over, the type that employs a knuckle pin receiving yoke on the crankpin of a crankshaft having pivotal or articulated connections with all of the connecting rods. This yoke member referred to is so arranged that every point thereon is adapted to move in an annular orbit of substantially the same magnitude as that of the crankpin axis by means of pivotal connections with a plurality of cantilever type auxiliary cranks of the same throw as the crankpin; the cranks being pivoted in the crankcase. The auxiliary cranks are all parallelly arranged with respect to the radial disposition of the crankpin and are interconnected by the said yoke member. This yoke member is subject to rotation around the crankpin center by the system of forces acting thereon via the connecting rods which are not directed to the center of the crankpin. These forces create a torque on the yoke member around the crankpin center. The crankcase receives the force created by the torque of the yoke member via the auxiliary cranks which are journalled in the crankcase and pivotally connected to the yoke member.

The object of this invention includes the provision of a cheap, simple, and dependable mechanism of the character described and for the purpose set forth whereby the effective operation of such a device is had with parts made not subject to close tolerance limits.

The invention contemplates the provision for engines or pumps of mechanism of the "masterless" connecting rod type compensating for bearing failure, heat expansions, and load deflections and the like.

Another object of the invention is the production of a device of the said character, employing light auxiliary links, which cannot be subjected to abnormal loads.

Another object of the invention is the provision of yieldable links whereby the forces created by the torque of the knuckle pin receiver are distributed among all the links.

The invention further contemplates the provision against severe damage to the parts of an engine or pump in the event of crankshaft bearing or crankpin bearing failure.

Another object is to provide a device of this character with compensating links in the torque transmitting train whereby the weight of the rotating masses on the crankpin are minimized, and whereby all the rotating parts are substantially dynamically balanced in their effect on the crankshaft.

To this end the invention uses a compensating link means between the knuckle pin receiver and the crankcase, said compensating links being pivotally associated with the crankcase and the knuckle pin receiver. The links preferably operably engage pins fixed in the knuckle pin receiver and to pins fixed in the crankcase, and are provided with means whereby the pins may move toward and away from each other in response to variations during normal or abnormal conditions.

Various and other specific objects and advantages are contemplated, as will clearly appear from the detailed description following; read in connection with the accompanying drawings which form a part of this disclosure, and which illustrate by way of example various preferred embodiments of the invention.

In the drawings:

Figure 1 is a section of an engine or pump, longitudinal of the crankshaft and illustrating one form of the invention.

Figure 2 is a section on the line 2—2 of Figure 1, with the connecting rods shown diagrammatically.

Figure 2A is a diagrammatic view of the parts in assembled non-running condition.

Figure 2B is a diagrammatic view showing the knuckle pin receiver under load during operation and under normal running condition Figure 2C is a similar view of another position of the parts.

Figure 2D is a similar view of Figure 2B with the parts in positions during an abnormal running condition.

Figures 3, 4, 5, 6, 7 and 8 are modified forms of links.

Figure 9:
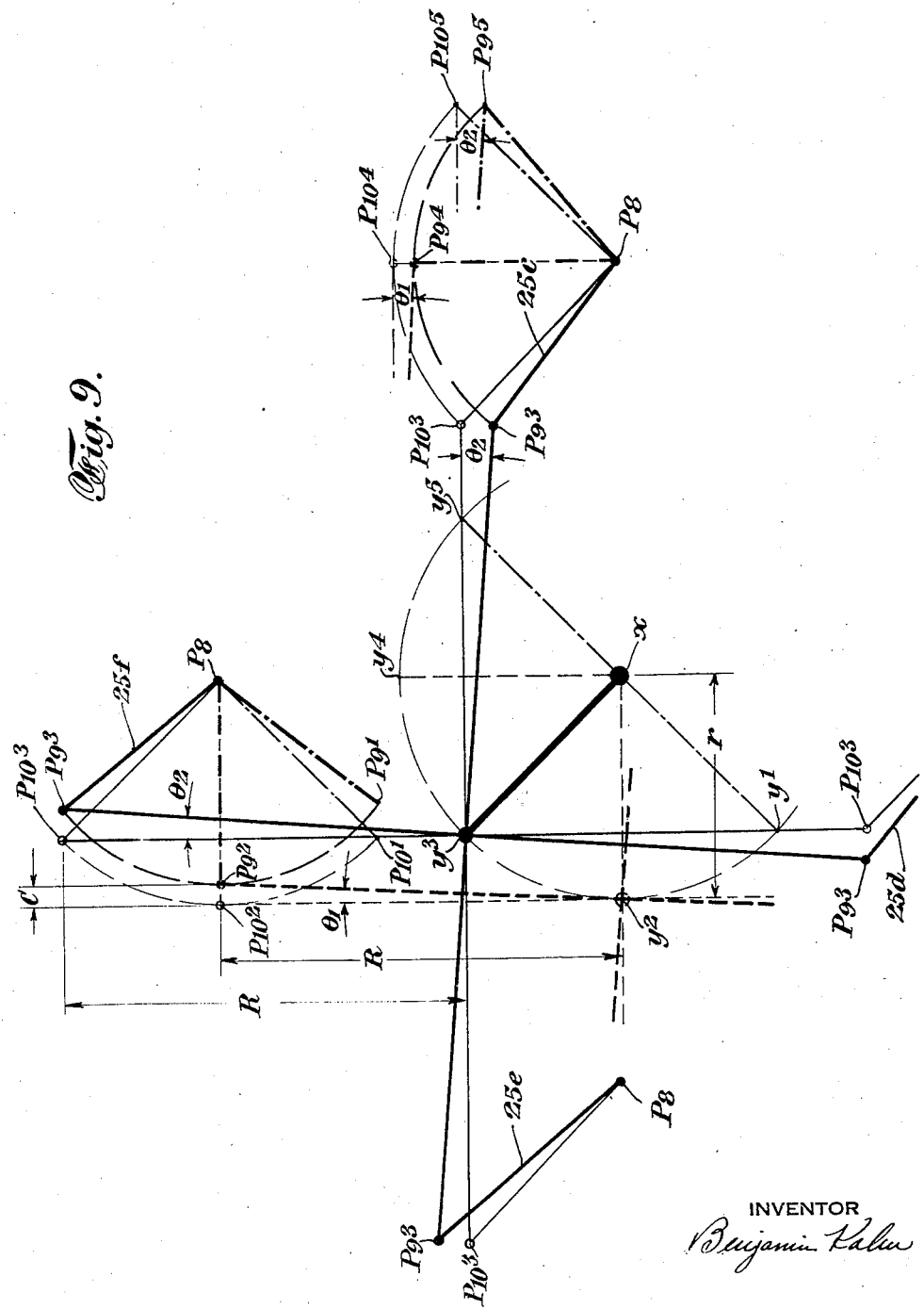
Figure 9 is a diagrammatic view of the movement of the parts in Figures 2 and 3 during one half of a revolution of the crankshaft.

In such mechanism described, beside other important considerations to be mentioned later, it is most desirable that the cooperating parts as well as the locations of the journals of the co-operating parts be made very accurately and within very close limits and low manufacturing tolerances, in order for them to function properly; otherwise, the parts will bind and replacements of individual parts will be difficult. The throw or effective length of the auxiliary cranks must all be quite equal to each other and equal to the throw or effective distances of the crankpin within the low allowable tolerances. Similarly, the journals for these auxiliary cranks must all be at quite equal radii from the center of the crankshaft. The diameters of the bearing portion of the journalled and pivoted cooperating parts must also be made extremely accurate in order to accomplish smooth rotation of the main crank, the yoke-like member, and the auxiliary cranks, without undue strain on these parts. Even with the necessary manufacturing tolerances within very close limits provided for in these parts, the smooth operation of such a device is not achievable in that this accuracy of the parts and the accuracy of cooperation of the parts cannot be maintained under operating conditions.

Even if the parts are ideally made, other factors which nullify such accuracy of the parts are heat expansion and load distortion as encountered under running conditions in pumps and especially in internal combustion engines. Therefore, no matter how accurate the parts are made, even under most exacting precision conditions, proper functioning of such structures as described, during running conditions, is unachievable.

A further disturbing factor in internal combustion engines especially, is deflections of parts under loads due to the high cylinder pressures as well as high inertia loads acting on the main crankpin. These loads not only displace the axes of the parts but also throw them out of parallel which induces high local bearing loads and high local frictional conditions which are decidedly disadvantageous.

The most serious consideration of such structures is the harmful effect upon an engine working under abnormal conditions such as resulting from excessive bearing wear or bearing failure. This is so because in the event of the excessive crankshaft or crankpin bearing wear or complete failure thereof, the annular path of travel, or orbit of the yoke, tends to change materially while the orbits of the crankpins of the auxiliary cranks are unvaried, thereby transferring part or all of the radial loads from the main crankpin to the auxiliary cranks. This causes overstraining of the auxiliary cranks which are preferably of light construction to keep the size and weight of the engine to a minimum, and are therefore relatively weak. These auxiliary cranks, preferably of cantilever construction, in cooperation with a yoke member, would each be almost as large and heavy as a main crank to withstand such forces after a bearing has failed.

In the prior art auxiliary cranks have been proposed which comprised rigid auxiliary cranks having pins thereon at fixed distances from each other, one of said pins being journalled in the crankcase and the other journalled in the knuckle pin receiver.

Floating bushings have been proposed in the prior art, which are disposed between the knuckle pin receiver and the auxiliary cranks, but this has been found inadequate for purpose of sufficiently compensating for load deflections and other distortions mentioned and are not capable of sustaining the parts during the loss of a bearing liner of wall thickness as low as .030". To accommodate for the loss of such a liner, at least eleven bushings would be required. Assuming a space between said bushings of .005", this provides .060" for take-up of the spaces between bushings; distributed as follows: .030" for the liner, at least .015" for accumulative manufacturing tolerance, and at least .015" for load deflection of the main crankpin. When it is desirable to employ at least three auxiliary cranks, the number of bushings necessary would be at least 33.

Furthermore, as found desirable in high output internal combustion engines to employ one auxiliary crank per cylinder, on a nine cylinder engine, 99 bushings would have to be employed.

Beside the large number of bushings necessary, a further disadvantage of such construction is the resulting increase in outside diameter of the engine. This is due to the large diameter of the outermost bushings which increases the inside diameter of the crankcase due to the larger clearance path required by the auxiliary cranks.

These examples take into account only the failure of the crankpin liner. The conditions are further aggravated and twice the number of bushings would be required if provision is desired against simultaneous failure of both the crankpin bearing liner and a similar crankshaft bearing liner.

Referring to Figures 1 and 2, a crankcase 10 is provided with bearings 11 adapted to support a crankshaft 12 having shaft portions 13 journalled in the bearings 11 and rotatable around an axis $x$—$x$. A crankpin 14 is disposed between crankcheeks 15 of the crankshaft. The axis $y$—$y$ of the crankpin is adapted to move in a substantially unvarying orbit of a radius $r$ around axis $x$—$x$. This distance $r$ is herein referred to as the throw of the crankpin.

Cylinders 16 are secured on the crankcase and are disposed radially to the axis $x$—$x$. Pistons 17 are adapted to reciprocate in the cylinders and are provided with wrist pins 18 having pivotally articulated connecting rods 19 which at their inner ends are journalled to knuckle pins 20. A knuckle pin receiver 21 journalled on the crankpin 14 is disposed with its center substantially coincident with the axis $y$—$y$ of the crankpin. A bearing liner 22 is interposed between the crankpin and the knuckle pin receiver.

The knuckle pin receiver is of substantially spool shape having a cylindrical portion 21a on the ends of which are provided flanges 21b adapted to provide bearings for the knuckle pins. The connecting rods are disposed between these flanges and are all pivotally articulated to the knuckle pin receiver, thereby producing a connecting rod driving train of the "masterless connectingrod" type; all of the rods being substantially identical.

One of the flanges of the knuckle pin receiver may be provided with a plurality of pins 23 extending toward one wall of the crankcase. This wall of the crankcase may be provided with pins 24 extending toward the knuckle pin receiver. Compensating links 25 are provided to span the distance between the said pins, that is, between each pin in the crank case and a corresponding pin in the receiver, a compensating link is provided. In the instance shown in this modification, each of these links is slotted at both ends as at 25a and 25b, the slots being open ended providing forked ends by means of which they are free to move longitudinally between the pins and are confined against transverse movement by the pins. By the term compensating links is meant, links that permit a limited amount of longitudinal movement at one or the other or both pins operatively associated at the ends thereof, whereby the distance between the pins is variable within a maximum and/or minimum limit, and whereby the links are fully effective only at their limit or limits.

The pins in the crankcase and in the receiver are so arranged that the links when assembled are substantially parallel to the radial disposition of the crankpin of the main crankshaft 12, as seen in Figure 2. With this arrangement the links rotate around the pins 24 in the crankcase in unison, and in a substantially parallel relationship to a plane containing the axes $x$, $x$ and $y$, $y$.

As seen in Figure 2A with the parts arranged in a non-working assembled position, the receiver is shown as disposed symmetrical to all the links and symmetrical to the disposition of the crankpin. It will be noted that in such position the links are bottomed on the crankcase pins and clearances C are provided between the bottom of the slots 25b and the pins 23 of the receiver. The distance B between the bottoms of the slots is shorter than the distance between pins to provide a substantially large gap C. This gap is provided to accommodate variations due to the necessary manufacturing tolerances in all dimensions and particularly in the critical dimensions such as D, E, F and G.

By providing the links with the dimension D of such magnitude as to leave a substantially large clearance C, the vital dimensions of the other parts are not necessarily confined to extremely low tolerances and a broader working range is possible in the manufacture of these parts. Assembly of these parts is thus facilitated.

Referring to Figure 2A it will be thus seen that the pins in the crankcase are not essentially located with great precision from the center of the crankshaft and that the pins in the receiver are not essentially located with great precision from the center of the receiver. And it will also be noted that variations in the relative disposition of the parts is accommodated by the provision of clearances C, such variations in disposition of the parts occurring during heat expansions and load deflections.

As seen in Figure 2B the parts are shown in relative position when a load is applied as for instance by means of a connecting rod 19a, in the direction shown. The force is not directed to the center of the crankpin $y$, which places a torque on the knuckle pin receiver 21 and thus turns it clockwise until the pin 23a bottoms in the slot 25b of the link 25c. The link 25c will transmit the force created by the torque of the receiver to the pin 24 in the crankcase. Upon rotation of the main crankpin 14 around the crankshaft center $x$, immediate from the position shown, the link 25c will rotate in substantial unison with the main crankpin and the torque on the receiver during said rotation will be transmitted to the crankcase, thus preventing the rotation of the receiver around the crankpin axis.

In the example shown employing four auxiliary links this torque of the receiver is transmitted thru only one link during approximately 90° of rotation of the crankshaft.

At the position of the links in Figure 2B the link 25c has borne this torque for approximately 45° of rotation and will continue to transmit the torque for the following 45°, approximately whereupon the torque is taken over by another adjacent link 25d, as indicated in Figure 2C.

The position of the parts shown in Figure 2C is at approximately the period when the link 25c is relieved of torque transmission and is transferred to the adjacent link 25d in the direction of rotation of the crankshaft. This link 25d will carry the torque load for approximately 90° whereupon the next link 25e comes into position as did the previous link, to take over the duty of transmitting the torque of the receiver to the crankcase Whereas in the illustration of the invention only four links have been shown which required the transfer of the torque to successive links about every 90° it will be seen that the invention is not limited to the employment of any definite number of links although it is preferred to employ three as a minimum.

With a greater number of links the transfer of the torque is more frequent during each cycle and the duration of load reception of the links, and the pins cooperating therewith, is correspondingly shortened and thus relieved of load during the more angulated positions of the links.

In the drawings the clearances C have been exaggerated for the purpose of clarity but in actual practice the clearance may be, for instance, about .060" which is ample to take care of pin location of the receiver, crankcase, and variations in the crankthrow, each of which has a location tolerance of approximately plus or minus .003".

During normal running condition and in the event of expansion of the crankcase, the pins 24 may move radially outward without affecting the operation as described.

The load deflections on the crankshaft which tend to shift the center of the crankpin radially inward or outward is possible without subjecting the links to any additional loads. Such changes of the crankpin center are accommodated by the provision of the clearances C which are disposed in the several links in such manner at all times, that the knuckle pin receiver may change its center while fulcruming on one of the links 25c, 25d, 25e, or 25f.

Referring to Figure 2D, the parts are shown in a position similar to that shown in Figure 2B, but as operating during an abnormal condition such as encountered after the failure or loss of the crankpin bearing liner 22. Due to the centrifugal force the receiver is moved outwardly and into contact with the crankpin. The center of the knuckle pin receiver $y'$ is thus caused to move in an annular orbit $Y'$ greater than the orbit Y of the crankpin center $y$ normally at the distance on radius $r$ from the center $x$ of the crankshaft. The receiver in moving outwardly is fulcrumed, for example, at a point P which is the center of one of the pins in the receiver thru which the torque is at the moment being transmitted. The pins P1, P2, and P3 in the receiver are thus moved away from their cooperating pins P4, P5, and P6 in the crankcase respectively. At the instant illustrated the pin P7 is being subjected to the force created by the torque of the receiver. Upon further rotation of the crankpin this force will be in turn received by the pins P4, P5, and P6 as previously described. The links are not exactly parallel under this condition but this does not affect the function of the parts.

In the above example it has been assumed that the receiver moves radially outward during liner failure, under certain conditions, the receiver will move inward due to the preponderance of the gas pressures over the centrifugal forces.

In Figure 3 one end of the link is slotted as at

30 to slidably cooperate with a pin 24 and the other end is in fixed relation to a pin 23.

In Figure 4 the link 31 comprises two slidably engageable parts 32 and 33 respectively associated with the pins 23 and 24. The parts 32 and 33 are adapted to co-act as a piston in a cylinder to cushion the shocks when the clearance is taken up. A vent hole 33a may be provided to allow oil to course therethru during the revolution of the crankshaft.

In Figure 5 the link 34 is similar to that shown in Figure 4 and includes a spring 35 between the slidable parts 36 and 37 respectively associated with the pins 24 and 23. The spring serves to yieldingly receive and transmit the forces created by the torque of the knuckle-pin receiver. The spring aids in reducing the impact loads during transfer of the forces created by the receiver torque from one link to another as described in connection with Figure 2B. By the use of such compression springs of proper strength, the forces created by the torque of the receiver may be received by more than one link; and may be received simultaneously in two or more adjacent links.

In Figure 6 the link 38 comprises slidably engageable members 39 and 40 respectively associated with the pins 23 and 24. A projection 41 in the member 40 provides shoulders for springs 42 and 43 respectively urged against the member 39 and a head 44 of a rod 45 secured to the member 39. These springs may be under initial compression and/or of such strength as to cause the distribution of the load created by the torque of the receiver among all the auxiliary links.

Figure 7 is a modification of the form shown in Figure 6 comprising a single resilient member 50 forming the link between the pins 24 and 23.

Figure 8 illustrates one form of the link 51 which may be adapted to act in tension by the application of the closed slot 52 as distinguished from the forms shown in Figures 1–5 which limit the rotation of the receiver in compression.

Referring to Figure 9, the axis of the crankshaft is indicated at $x$ and the axis of the crankpin is indicated at $y$. The axis of the journals of the auxiliary links are indicated at P8. The points P9 indicate the various positions of the pins which are fixed with respect to the receiver center at a distance R. These points P9 are thus positioned with the assumption that a clearance C is provided. The heavy full lines represent the instant position of the parts when the crankpin $y$ is at the position $y^3$ when the torque load is transferred from link 25f to link 25c. The heavy dot and dash lines represent the instant position of the parts at previous and subsequent transfer positions corresponding to the crankpin positions $y^1$ and $y^5$. The heavy dotted lines represent the instance positions of parts midway of the transfer positions. The exponents of the reference characters indicate corresponding positions of cooperating parts.

Points P10 represent the plurality of points if such clearance C were not provided.

It will be noted that the points $x$, $y$ (with any exponent), P8, and P10 (with corresponding exponent) always define a parallelogram and that the points $x$, $y$ P8, and P9 do not form a parallelogram in view of the fact that the distance P8—P9 is less than the distance $x$—$y$. In some cases as when employing links as shown in Figure 8 the distance P8—P9 may at times be greater and at times less than the distance $x$—$y$.

It will also be noted that the lines $y$—P9 are not parallel to the line $x$—P8 and that this unparallel relation varies during the arcuate movement of the crankpin during 90°. That is, the angle $\theta_1$ is less than the angle $\theta_2$. This indicates that during the travel of the point $y$ from its position midway of its effective load transmitting rotation, the angle $\theta_1$ increases and is greatest at its transfer point where the adjacent link becomes effective and takes over the torque resisting load. This clearly indicates that during the rotation of the crankpin the receiver is caused to oscillate around the crank-pin axis. The amount of this oscillation depends upon the amount of clearance C provided and if little clearance is provided little oscillation will take place. This oscillation is very slight. For example, in the previous mentioned case, a clearance of $\frac{1}{16}$ of an inch causes an oscillation of the receiver of about plus or minus three minutes. With larger clearance provided this oscillation may be increased to such an extent as to provide a pumping action between the elements as illustrated in Figures 4 and 5. This pumping action may be made useful in dampening the limit stops between these relatively movable parts and thereby relieve these parts as well as the crankcase of impact loads and thereby also cushioning their action during transfer of the force created by the torque of the receiver, from one link to an adjacent link.

As will be seen in the Figures 3, 4, 5, 6, 7 and 8, all shown in normal assembled relationship to the pins 23 and 24, the clearances C definitely limit the amount of movement between pins 23 and 24 in at least one direction. In the forms shown in Figures 5, 6 and 7 which are adapted to yieldingly transmit the force created by the torque of the receiver to the crankcase, the springs may be of sufficient strength to yeldingly limit the movement between the pins without abutment of the limiting shoulders of the clearances C.

In the modification shown in Figures 1 and 2, employing a link having both ends forked, the pins 23 and 24 are necessarily anchored in the receiver and crankcase respectively.

In the form shown in Figure 3, where only the end of the link associated with the crankcase is forked, the pin 23 at the other end may be anchored in the receiver and journalled in the link, or the pin may be anchored in the link and journalled in the receiver.

It will therefore be seen that either end of the link may be forked and the clearance or compensation may be provided in the end of the link in operative engagement with the pin 23 associated with the receiver. In this case the pin 24, may be anchored in the link or in the crankcase. It will therefore be seen that the link shown in Figure 3 may be reversed end for end with the same efficacy.

The link shown in Figure 8 may be similarly reversed but in this instance the link is effective in transmitting the torque of the receiver in its maximum effective length.

The links shown in Figures 4 to 7 having their clearances or compensating characteristics embodied in the link per se, are adapted to definitely limit positive as well as negative torque of the receiver.

All of the links shown are effective in transmitting positive as well as negative torque of the receiver as is the modification shown in Figures 1 and 2 as will readily be seen by reference to Figure 2 and substitution of any of the links shown in Figures 3 to 8 for the link shown in Figure 2. If, for example, the torque of the receiver is clockwise at the instant position as indicated by the arrow on the left of Figure 2, the link at the left of this figure becomes effective in compression. If the torque were counterclockwise as indicated by the arrow at the right of the figure the link at the right becomes effective in limiting this torque. It is well known that in an engine having definite direction of rotation of the crankshaft the direction of the receiver may be entirely positive or partly negative.

Having thus described the principle of the invention as applied to several preferred forms, it is to be understood that other forms may be had without departing from the principle of the invention as defined by the appended claims, what is claimed is:

1. In a mechanism of the character described for converting reciprocating motion into rotary motion or vice versa, the combination including a crankcase having a plurality of definitely positioned pivotal means each providing a fixed axis of rotation, a crankshaft in the crankcase having a crankpin, a knuckle pin receiver on the crankpin having a plurality of definitely positioned pivotal means each providing a fixed axis of rotation, and compensating links adapted to limit rotation of the receiver around the crankpin each of said links operatively engaged with one of said pivotal means in the crankcase and with one of said pivotal means in the receiver, said links being of effective length different than the throw of the crankpin thereby permitting the distance between said axes of rotation engaged by each link to vary during rotation of the crankshaft.

2. In a mechanism of the character described for converting reciprocating motion into rotary motion or vice versa, the combination including a crankcase having pins definitely positioned therein, a crankshaft having a crankpin, a knuckle pin receiver on the crankpin having pins definitely positioned therein, and compensating links each cooperable with one of said pins positioned in the crankcase and one of said pins positioned in the receiver, said links permitting the distance between the pins cooperable with each link to vary during rotation of the crankshaft.

3. In a mechanism of the character described for converting reciprocating motion into rotary motion or vice versa the combination including a crankcase, pins definitely positioned in the crankcase, a crankshaft in the crankcase having a crankpin, a knuckle pin receiver on the crankpin, pins definitely positioned in the knuckle pin receiver, and compensating links each cooperable with one of said pins definitely positioned in the crankcase and with one of said pins definitely positioned in the receiver, said links permitting the distance between the pins cooperable with each link to vary during the rotation of the crankshaft.

4. In a mechanism of the character described for converting reciprocating motion into rotary motion or vice versa, the combination including a crankcase having a plurality of definitely positioned pivotal means each providing a fixed axis of rotation, a crankshaft in the crankcase having a crankpin, a knuckle pin receiver on the crankpin having a plurality of definitely positioned pins, and compensating links each engaged with one of said pins and cooperatively engaged with one of said definitely positioned pivotal means, said links permitting the distance between said axes of rotation and said pins cooperable with each link to vary during rotation of the crankshaft.

5. In a mechanism of the character described for converting reciprocating motion into rotary motion or vice versa, the combination including a crankcase having a plurality of definitely positioned pins, a crankshaft in the crankcase, a knuckle pin receiver having a plurality of definitely positioned pivotal means each providing a fixed axis of rotation, and compensating links each cooperatively engaged with one of said definitely positioned pivotal means and operatively joined to one of said pins, said links permitting the distance between said axes of rotation and said pins joined by each link to vary during rotation of the crankshaft.

6. In a mechanism of the character described for converting reciprocating motion into rotary motion or vice versa, the combination including a crankcase having a plurality of definitely positioned pivotal means each providing a fixed axis of rotation, a crankshaft in the crankcase having a crankpin, a knuckle pin receiver on the crankpin having a plurality of definitely positioned pivotal means each providing a fixed axis of rotation, said receiver being subject to torque around the crankpin, and resilient links each cooperatively engaged with one of said fixed axes in the crankcase and one of said fixed axes in the receiver, whereby the forces created by the torque of the receiver are resiliently transmitted to the crankcase.

7. In a mechanism of the character described for converting reciprocating motion into rotary motion or vice versa, the combination including a crankcase having a plurality of definitely positioned pivotal means each providing a fixed axis of rotation, a crankshaft in the crankcase having a crankpin, a knuckle pin receiver on the crankpin having a plurality of definitely positioned pivotal means each providing a fixed axis of rotation, said receiver being subject to torque around the crankpin, and yieldable links each operably engaged with one of said definitely positioned means in the crankcase and one of said means in the receiver, whereby the forces created by the torque of the receiver are resiliently transmitted to the crankcase and dampened in said links.

8. In a mechanism of the character described for converting reciprocating motion into rotary motion or vice versa, the combination including a crankcase having a plurality of definitely positioned pivotal means each providing a fixed axis of rotation, a crankshaft in the crankcase having a crankpin, a knuckle pin receiver on the crankpin having a plurality of definitely positioned pivotal means each providing a fixed axis of rotation, said receiver being subject to torque around the crankpin, and resilient links each operably engaged with one of said fixed axes in the crankcase and one of said fixed axes in the receiver, whereby the torque of the receiver is distributed among all the links and transmitted to the crankcase.

9. In a mechanism of the character described for converting reciprocating motion into rotary motion or vice versa, the combination including a crankcase having a plurality of pivotal means each providing a definitely positioned axis of rotation, a crankshaft in the crankcase having a crankpin, a knuckle pin receiver on the crankpin having a plurality of pivotal means each providing a definitely positioned axis of rotation, and compensating links each cooperably engaged with one of said means in the crankcase and with one of said means in the receiver, whereby the distance between the means spanned by each link is variable during the rotation of the crankshaft.

10. In a mechanism of the character described for converting reciprocating motion into rotary motion or vice versa, the combination including a crankcase, journals in the crankcase each providing a definitely positioned axis of rotation, a crankshaft in the crankcase having a crankpin, a knuckle pin receiver on the crankpin, journals in the receiver each providing a definitely positioned axis of rotation, and links each having a pin in a journal of the crankcase and a pin in a journal of the receiver, said links having means whereby the distance between the pins may vary during the rotation of the crankshaft.

11. In a mechanism of the character described for converting reciprocating motion into rotary motion or vice versa, the combination including a crankcase having a plurality of definitely positioned pivotal means providing axes of rotation, a crankshaft in the crankcase having a crankpin, a knuckle pin receiver on the crankpin having a plurality of definitely positioned pivotal means providing axes of rotation, and links each cooperably engaged with one of said definitely positioned means in the crankcase and with one of said means in the receiver, each link having two means each providing a definitely positioned axis of rotation, one coincidable with one of said means in the crankcase and the other coincidable with the other of said means in the receiver, said links permitting the distance between the axes of rotation joined by each link to vary during rotation of the crankshaft.

12. In a mechanism of the character described for converting reciprocating motion into rotary motion or vice versa, the combination including a crankcase having pins definitely positioned therein, a crankshaft having a crankpin, a knuckle pin receiver on the crankpin having pins definitely positioned therein, and links each cooperable with one of said pins positioned in the crankcase and one of said pins positioned in the receiver, each link having two means each providing definitely positioned axis of rotation, one coincidable with one of said pins in the crankcase and the other coincidable with one of said pins in the receiver, said link having means whereby the distance between the pins cooperable with each link is variable during rotation of the crankshaft.

13. In a mechanism of the character described for converting reciprocating motion into rotary motion or vice versa, the combination including a crankcase having a plurality of pivotal means each providing a definitely positioned axis of rotation, a crankshaft in the crankcase having a crankpin, a knuckle pin receiver on the crankshaft having a plurality of pivotal means each providing a definitely positioned axis of rotation, and links each joining one of said means in the crankcase and one of said means in the receiver, each of said links having two means each providing a definitely positioned axis of rotation one coincidable with one of said means in the crankcase and the other coincidable with one of said means in the receiver, each of said links having yieldable means whereby the distance between the means in the crankcase and the means in the receiver is variable during the rotation of the crankshaft.

14. In a device of the character described for converting reciprocating motion into rotary motion or vice versa, the combination of a crankcase, a crankshaft in said crankcase, a crankpin on said crankcase, a member subject to torque carried by said crankpin, a plurality of compensating links each having one end operatively engaged with said torque subjected member and the other end operatively engaged with said crankcase, the effective length of each of said links being uniform and different than the distance between the crankshaft and the crankpin, whereby rotation of said torque subjected member around said crankpin is prevented by the links in overlapping succession during rotation of the crankshaft.

15. In a device of the character described for converting reciprocating motion into rotary motion or vice versa, the combination of a crankcase, a crankshaft in said crankcase, a crankpin on said crankshaft, torque inducing means, a member subject to said torque and carried by said crankpin, a plurality of compensating links each having one end operatively engaged with said torque receiving member and the other end operatively engaged with the crankcase, the effective length of each of said links being uniform and different than the distance between the crankshaft and the crankpin, whereby rotation of said torque receiving member around said crankpin is prevented by each of said links in succession during rotation of the crankshaft.

16. In a device of the character described for converting reciprocating motion into rotary motion or vice versa, the combination of a crankcase, a crankshaft in said crankcase, a crankpin on said crankshaft, a member subject to torque carried by said crankpin, a plurality of compensating links each having one end operatively engaged with said torque receiving member and the other end operatively engaged with said crankcase, the effective length of each of said links being uniform and less than the distance between the crankshaft and the crankpin, whereby rotation of said torque receiving member around said crankpin is prevented by each of said links in succession and in compression during rotation of the crankshaft.

17. In a device of the character described for converting reciprocating motion into rotary motion or vice versa, the combination of a crankcase, a crankshaft in said crankcase, a crankpin on said crankshaft, a member subject to torque carried by said crankpin, a plurality of compensating links each having one end operatively engaged with said torque receiving member and the other end operatively engaged with said crankcase, the effective length of each of said links being uniform and greater than the distance between the crankshaft and the crankpin, whereby rotation of said torque receiving member around said crankpin is prevented by each of said links in succession and in tension during rotation of the crankshaft.

18. In a device of the character described for converting reciprocating motion into rotary motion or vice versa, the combination of a crankcase, a crankshaft in said crankcase, a crankpin in said crankshaft, a member subject to torque carried by said crankpin, a plurality of yieldable links each having one end operatively engaged with said torque subjected member and the other end operatively engaged with said crankcase, the effective length of each of said links being uniform and different than the distance between the crankshaft and the crankpin, whereby rotation of said torque subjected member around said crankpin is prevented by the links in overlapping succession during rotation of the crankshaft.

19. In a mechanism of the character described for converting reciprocating motion into rotary motion or vice versa, the combination of a crankcase having a plurality of definitely positioned means each providing a fixed axis of rotation, a rotatable crankshaft in the crankcase, a crankpin on the crankshaft at a fixed distance therefrom, a knuckle pin receiver subjected to torque rotatably carried by the crankpin, said receiver having a plurality of definitely positioned pivotal means each providing a fixed axis of rotation, and a plurality of links each operatively engaged between one of said fixed axes in the crankcase and one of said fixed axes in the receiver, each of said links adapted to rotate about its fixed axis in the crankcase and adapted to limit rotation of said receiver around the crankpin, the effective length of each of said links being uniform and different than the distance between the crankpin and the crankshaft, whereby the receiver is caused to oscillate during rotation of the crankshaft and whereby the distance between said axis of rotation engaged by each link is variable.

20. In an internal combustion engine or pump of the masterless connecting rod type having a knuckle pin receiver on the crankpin of a crankshaft, links operatively connected between the receiver and the crankcase and adapted to transmit torque of said knuckle pin receiver, said links being of effective length unequal to the throw of the crankpin.

21. In a mechanism of the character described for converting reciprocating motion into rotary motion or vice versa, the combination including a crankcase having pins definitely positioned rotatably or non-rotatably therein, a crankshaft having a crankpin, a knuckle pin receiver on the crankpin having pins definitely positioned rotatably or non-rotatably therein, and longitudinally variable links each cooperable with one of said pins positioned in the crankcase and one of said pins positioned in the receiver, said links permitting the distance between the pins cooperable with each link to vary during rotation of the crankshaft.

22. A mechanism is set forth in claim 21 in which the links are longitudinally resilient.

23. In a mechanism of the character described for converting reciprocating motion into rotary motion or vice versa, the combination including a crank case, a crank shaft having a crank pin, a knuckle pin receiver on the crank pin, and a plurality of compensating links having end connections to the crank case and knuckle pin receiver and permitting relative sliding movement of said end connections of each of said links longitudinally of the axis of the corresponding link while retaining each of said end connections against any substantial shifting in a direction transverse to the link axis, either relative to the part engaged by the connection or relative to the link.

24. In a mechanism of the character described for converting reciprocating motion into rotary motion or vice versa, the combination including a crankcase, a crankshaft having a crankpin, a knuckle pin receiver on the crankpin, and a plurality of compensating links, each of said links comprising relatively slidable telescoping members respectively having end connections to the crankcase and knuckle pin receiver and permitting relative sliding movement of said end connections of each of said links longitudinally of the axis of the corresponding link while retaining each of said end connections against any substantial shifting in a direction transverse to the link axis, either relative to the part engaged by the connection or relative to the link.

25. In a mechanism of the character described for converting reciprocating motion into rotary motion or vice versa, the combination including a crankcase, a crankshaft having a crankpin, a knuckle pin receiver on the crankpin, and a plurality of compensating links comprising relatively slidable telescoping members forming a variable pressure chamber therebetween and respectively having end connections to the crankcase and knuckle pin receiver, said links permitting relative sliding movement of said end connections of each of said links longitudinally of the axis of the corresponding link while retaining each of said end connections against any substantial shifting in a direction transverse to the link axis, either relative to the part engaged by the connection or relative to the link.

26. A mechanism as set forth in claim 25 further provided with means for supplying oil under pressure to the pressure chamber of each link.

BENJAMIN KAHN.